US007246896B2

(12) United States Patent
Askeland et al.

(10) Patent No.: US 7,246,896 B2
(45) Date of Patent: Jul. 24, 2007

(54) INK-JET PRINTING METHODS AND SYSTEMS PROVIDING IMPROVED IMAGE DURABILITY

(75) Inventors: Ronald A. Askeland, San Diego, CA (US); Kai-Kong Iu, San Diego, CA (US); Dennis P. Parazak, Oceanside, CA (US); Rodney Stramel, San Diego, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 282 days.

(21) Appl. No.: 10/823,440

(22) Filed: Apr. 12, 2004

(65) Prior Publication Data

US 2005/0225618 A1 Oct. 13, 2005

(51) Int. Cl.
*G01D 11/00* (2006.01)

(52) U.S. Cl. ......................... 347/100; 347/101; 347/95

(58) Field of Classification Search ................ 347/101, 347/100, 95, 96; 106/31.6, 31.27, 31.13; 523/160
See application file for complete search history.

(56) References Cited

U.S. PATENT DOCUMENTS 6,270,214 B1 * 8/2001 Smith et al. ................ 347/100
6,428,157 B1 * 8/2002 Wen ........................... 347/101
6,439,708 B1 * 8/2002 Kato et al. .................. 347/100
2003/0202039 A1 10/2003 Rutland et al.

FOREIGN PATENT DOCUMENTS

| | | |
|---|---|---|
| EP | 1 193 078 A2 | 4/2002 |
| EP | 1227136 A1 | 7/2002 |
| EP | 1 308 491 A2 | 5/2003 |
| WO | WO02/45970 | 6/2002 |
| WO | WO02/059222 | 8/2002 |

* cited by examiner

*Primary Examiner*—Manish S. Shah

(57) ABSTRACT

Systems and methods for providing smudge resistant and durable ink-jet images are provided. Specifically, a system for printing durable ink-jet ink images can comprise a first printhead containing a fixer composition including a charged fixer component, wherein the first printhead is configured for ink-jet printing the fixer composition on a substrate. The system can further comprise a second printhead containing an ink-jet ink, wherein the second printhead is configured for ink-jet printing the ink-jet ink composition over the fixer composition. The ink-jet ink can also include a colorant carrying an opposite charge with respect to the charged fixer component. A third printhead containing a polymer overcoat composition can also be present, and can be configured for ink-jet printing the polymer overcoat composition over ink-jet ink composition. The polymer of the polymer overcoat composition can also carry an opposite charge with respect to the charged fixer component.

39 Claims, No Drawings

INK-JET PRINTING METHODS AND SYSTEMS PROVIDING IMPROVED IMAGE DURABILITY

FIELD OF THE INVENTION

The present invention is drawn to the area of ink-jet imaging. More specifically, the present invention is drawn to durable images, as well as methods and systems for producing images with improved image durability.

BACKGROUND OF THE INVENTION

There are several reasons that ink-jet printing has become a popular way of recording images on various media surfaces, particularly paper. Some of these reasons include low printer noise, capability of high-speed recording, and multicolor recording. These advantages can be obtained at a relatively low price to consumers. However, though there has been great improvement in ink-jet printing, accompanying this improvement are increased demands by consumers in this area, e.g., higher speeds, higher resolution, full color image formation, increased stability, increased image durability, etc.

In general, ink-jet inks are either dye- or pigment-based inks. Both are typically prepared in a liquid vehicle that contains the dye and/or the pigment. Dye-based ink-jet inks generally use a liquid colorant that is water soluble, and pigmented inks typically use a solid or dispersed colorant to achieve color. In many systems, ink-jet ink printed images are not as durable as laser printed images. As such, investigations continue into systems and formulations that can compete favorably with laser printing technology with respect to image durability, including improved smudge resistance, water fastness, humid fastness, and the like.

SUMMARY OF THE INVENTION

It has been recognized that the application of certain components in layers can provide good image permanence and smudge resistance. Specifically, a system for printing durable ink-jet ink images can comprise multiple printheads containing various fluid substances. The system can comprise a first printhead containing a fixer composition including a charged fixer component, wherein the first printhead is configured for ink-jet printing the fixer composition on a substrate. The system can also comprise a second printhead containing an ink-jet ink, wherein the second printhead is configured for ink-jet printing the ink-jet ink composition over the fixer composition, and wherein the ink-jet ink includes a colorant carrying an opposite charge as the charged fixer component. A third printhead can contain a polymer overcoat composition, and can be configured for ink-jet printing the polymer overcoat composition over ink-jet ink composition. The polymer of the polymer overcoat composition also carries an opposite charge with respect to the charged fixer component.

In another embodiment, a method for printing durable ink-jet ink images can comprise steps of applying a cationic fixer composition onto a media substrate; jetting an anionic colorant-containing ink-jet ink composition onto the fixer composition that has been applied to the media substrate; and jetting an anionic polymer overcoat composition onto the ink-jet ink composition that has been jetted onto the fixer composition. In an alternative embodiment, the steps can include applying an anionic fixer composition onto a media substrate; jetting a cationic colorant-containing ink-jet ink composition onto the fixer composition that has been applied to the media substrate; and jetting a cationic polymer overcoat composition onto ink-jet ink composition that has been jetted onto the fixer composition.

In still another embodiment, a durable printed image can comprise a media substrate having a cationic fixer composition, an ink-jet ink composition, and an anionic polymer overcoat composition printed in layers thereon. If the layers are printed in succession prior to the drying of the previous layer, some fluid mixing can occur. The cationic fixer composition can be jetted on the media substrate as a first printed layer. The ink-jet ink composition can be jetted on the fixer composition as a second printed layer, wherein the ink-jet ink includes an anionic colorant. The anionic polymer overcoat composition can be jetted on the ink-jet ink composition as a third printed layer. In an alternative embodiment, the durable printed image can include a media substrate having an anionic fixer composition, an ink-jet ink composition, and a cationic polymer overcoat composition printed in layers thereon. If the layers are printed in succession prior to the drying of the previous layer, some fluid mixing can occur. The anionic fixer composition can be jetted on the media substrate as a first printed layer. The ink-jet ink composition can be jetted on the fixer composition as a second printed layer, wherein the ink-jet ink includes a cationic colorant. The cationic polymer overcoat composition can be jetted on the ink-jet ink composition as a third printed layer.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms “a,” “an,” and “the” include plural referents unless the context clearly dictates otherwise.

As used herein, “liquid vehicle” refers to the fluid in which the charged components of fixer compositions, charged colorants of ink-jet inks, or charged polymers of polymer overcoat compositions are dissolved or dispersed to form compositions in accordance with the present invention. Many liquid vehicles and vehicle components are known in the art. Typical ink vehicles can include a mixture of a variety of different agents, such as surfactants, co-solvents, buffers, biocides, sequestering agents, viscosity modifiers, and water. In addition to the cationic or anionic component, colorant, or overcoat polymer carried by the liquid vehicle, other solids or materials can also be carried by (dispersed or dissolved in) the liquid vehicle. The liquid vehicle can also include liquids that may inherently be present with the cationic or anionic component of the fixer composition, colorant of the ink-jet ink, or polymer of the overcoat composition. For example, with respect to the polymer overcoat composition, if the polymer particulates of the composition are provided from a latex dispersion, the aqueous phase of a latex dispersion can become part of the liquid vehicle upon mixing with the liquid vehicle components.

"Cationic component," when referring to the dispersants or solutes within a fixer composition, refers to polymers, multivalent ions or salts, organic acids, and the like, that are positively charged and act to fix a latex component of a latex-containing colloidal suspension within an ink-jet ink upon contact. These cationic components are used in systems wherein the ink-jet ink carries an anionic colorant, and the polymer overcoat composition is an anionic polymer overcoat composition.

An "anionic component," when referring to the dispersants or solutes within a fixer composition, refers to fixer components that carry a negative charge. These anionic components are used in systems wherein the ink-jet ink carries a cationic colorant, and the polymer overcoat composition is a cationic polymer overcoat composition.

A "colorant" can include dyes and/or pigments that are to be dissolved or suspended in the liquid vehicle prepared in accordance with embodiments of the present invention. Cationic or anionic dyes and/or pigments can be used, depending on the system in which the colorant is implemented for use. Anionic dyes are typically water soluble, and therefore, can be desirable for use in many embodiments. However, cationic dyes can be used in other embodiments. Alternatively, anionic or cationic pigments can also be used, depending on the system or method. Pigments that can be used include self-dispersed pigments and non self-dispersed pigments. Self-dispersed pigments include those that have been chemically surface modified with a small molecule charge or a polymeric grouping. This chemical modification aids the pigment in becoming and/or substantially remaining dispersed in a liquid vehicle. The pigment can also be a non self-dispersed pigment that utilizes a separate dispersing agent (which can be a polymer, an oligomer, or a surfactant, for example) in the liquid vehicle and/or in the pigment that utilizes a physical coating to aid the pigment in becoming and/or substantially remaining dispersed in a liquid vehicle.

"Anionic polymer" or "anionic polymeric particulate" refers to polymers having surface anionic groups. The anionic polymers can be suspended in a liquid vehicle to form an anionic polymer overcoat composition in accordance with embodiments of the present invention. These anionic polymers can be used with cationic fixer compositions and ink-jet inks that carry an anionic colorant.

"Cationic polymer" or "cationic polymeric particulate" refers to polymers having surface cationic groups. The cationic polymers can be suspended in a liquid vehicle to form a cationic polymer overcoat composition in accordance with embodiments of the present invention. These cationic polymers can be used with anionic fixer compositions and ink-jet inks that carry a cationic colorant.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desire effect. For example, an effective amount of a "liquid vehicle" is at least the minimum amount required in order to create a composition in accordance with embodiments of the present invention, i.e. fixer composition, ink-jet ink composition, or polymer overcoat composition, while maintaining properties necessary for effective ink-jetting.

The term "about" when referring to a numerical value or range is intended to encompass the values resulting from experimental error that can occur when taking measurements.

With this in mind, the present invention is drawn to the area of ink-jet imaging. More specifically, the present invention is drawn to printed images, as well as systems and methods of printing images that provide good smudge resistance, thus providing a more permanent image. In one embodiment, a system for printing durable ink-jet ink images can comprise multiple printheads containing various fluid substances. Specifically, the system can comprise a first printhead containing a fixer composition including a charged fixer component, wherein the first printhead is configured for ink-jet printing the fixer composition on a substrate. The system can also comprise a second printhead containing an ink-jet ink, wherein the second printhead is configured for ink-jet printing the ink-jet ink composition over the fixer composition, and wherein the ink-jet ink includes a colorant carrying an opposite charge as the charged fixer component. A third printhead can contain a polymer overcoat composition, and can be configured for ink-jet printing the polymer overcoat composition over ink-jet ink composition. The polymer of the polymer overcoat composition also carries an opposite charge as the charged fixer component. Each of the three printheads can be present in a common ink-jet pen, two printheads can be present in a common ink-jet pen, or each can be present in a separate ink-jet pen.

In another embodiment, a method for printing durable ink-jet ink images can comprise steps of applying a cationic fixer composition onto a media substrate; jetting an anionic colorant-containing ink-jet ink composition onto the fixer composition that has been applied to the media substrate; and jetting an anionic polymer overcoat composition onto the ink-jet ink composition that has been jetted onto the fixer composition. The applying of the cationic fixer composition can be by jetting, by another coating process such as roller coating, or by adding the fixer composition while forming the media substrate during the manufacturing process. Alternatively, the method can utilize an anionic fixer composition, an ink-jet ink including a cationic colorant, and a cationic polymer overcoat composition.

In still another embodiment, a durable printed image can comprise a media substrate having a cationic fixer composition, an ink-jet ink composition, and an anionic polymer overcoat composition printed thereon. The cationic fixer composition can be jetted on the media substrate as a first printed layer. The ink-jet ink composition can be jetted on the fixer composition as a second printed layer, wherein the ink-jet ink includes an anionic colorant. The anionic polymer overcoat composition can be jetted on the ink-jet ink composition as a third printed layer. Alternatively, the durable printed image can be formed using an anionic fixer composition, an ink-jet ink including a cationic colorant, and a cationic polymer overcoat composition.

It is to be understood that the present invention is drawn generally toward the application of a fixer composition to a media substrate that has a generally opposite charge as the subsequently applied colorant and overcoating composition. Thus, in a preferred embodiment, the fixer composition can include a fixer composition having a cationic component, an ink-jet ink including an anionic colorant, and polymer overcoating composition including anionic polymers. As such, description of this embodiment is provided in detail. However, an alternative embodiment, which is also within the scope of the present invention, can include a fixer composition having an anionic component, an ink-jet ink including a cationic colorant, and polymer overcoating composition including cationic polymers. Thus, when referring to embodiments that include the use of the cationic fixer composition, the ink-jet ink including the anionic colorant, and the anionic polymer composition, it is to be understood that such discussion can also apply to alternative embodiments described herein, namely, the use of anionic fixer composition, ink-jet inks including cationic colorant, and cationic polymer compositions.

In each of the embodiments described herein, the cationic fixer composition can include a cationic component configured to react, precipitate, and/or flocculate with an anionic dye and/or an anionically dispersed pigment of an ink-jet ink. Alternatively, or in addition, the cationic component can be configured to react, precipitate, and/or flocculate with an anionic polymer of the anionic polymer overcoat composition. As such, in one embodiment, the fixer composition, the ink-jet ink composition, and the anionic polymer overcoat composition can be printed in layers in succession such that each layer is still wet when a subsequent layer is added. In this manner, distinct layers can be formed with some mixing of fluids at interfaces between layers. Further, even though applied in layers, the anionic polymer overcoat can also mix and react with the cationic fixer composition.

Regarding amounts of each component, the cationic component can be a cationic polymer, a multivalent ion, an organic acid, or the like. Whether cationic or anionic, the charged component of the fixer composition can be present in the liquid vehicle at from 0.2 wt % to 15 wt % of the total ink-jettable composition. The ink-jet ink can comprise an effective amount of a liquid vehicle and from 0.1 wt % to 10 wt % of a dye or pigment colorant. The anionic (or cationic) polymer overcoat composition can include an effective amount of liquid vehicle and from 1 wt % to 8 wt % polymeric particulates. In one embodiment, latex particulates can be used which are provided to the polymer overcoat composition by a latex dispersion.

Fixer Composition

A fixer composition can be used in accordance with embodiments of the present invention. Typically, the fixer composition is applied to a media substrate prior to the application of an ink-jet ink and an anionic polymer overcoat composition. The application of fixer composition to the media substrate can prevent undesired penetration of ink-jet inks, and can react with the colorant of the ink-jet ink to prevent feathering and bleed. However, fixer alone does not provide a substantial degree of durability when used with conventional ink-jet ink systems. By combining the use of an anionic polymer overcoat composition, as will be described hereafter, the fixer composition can interact with the colorant of the ink-jet ink composition and/or the anionic polymer of the anionic polymer overcoat composition, thereby improving smudge and smear resistance while maintaining good color strength. This enhanced smear and smudge resistance, in addition to maintaining good color strength, is noticeable after partial drying when images are produced using the systems and methods of the present invention.

Though the application of the fixer composition by a jetting process is often preferable, other application methods of the fixer composition are within the scope of the present invention. For example, the media substrate can be pretreated with a fixer composition. To illustrate, fixer pretreatment can be carried out by incorporating the fixer composition into a paper manufacturing process, or alternatively, the fixer composition can be coated on a media substrate by a process other than a jetting process, e.g., roller application, etc.

Examples of cationic components that can be used in a cationic fixer composition in accordance with embodiments of the present invention include cationic polymers, organic acids, and/or multivalent salts. Examples of cationic polymers that work well in accordance with embodiments of the present invention include poly(vinyl pyridine) salts, polyalkylaminoethyl acrylates, polyalkylaminoethyl methacrylates, poly(vinyl imidazole), poly(glucosamine), polyethyleneimines, polybiguanides, polyhexmethyleneguanidine, and/or polyguanides. Organic acids or multivalent salts can also be used alone or in combination with each other, or in combination with cationic polymers. In one embodiment, a fixer composition can be prepared that includes cationic polymers, and further contain ions or other compositions that can assist the fixing of the ink-jet ink composition or the anionic polymer overcoat composition. For example, in addition to the cationic polymer composition that can be present in the fixer, a multivalent salt can also be present. Examples include multivalent metal nitrates, EDTA salts, phosphonium halide salts, organic acids (such as glycolic acid, succinic acid, citric acid, acetic acid, and the like), and combinations thereof. In one embodiment, along with the cationic polymer, a calcium ion can be present in the fixer composition.

Alternatively, in embodiments where the colorant of the ink-jet ink and the polymer of the polymer overcoat composition are both cationic, anionic components that can be used in an anionic fixer composition include poly acrylic acid, poly methacrylic acid, polystyrene sulfonate, and the like. Other polymers having other anionic substituents, including carboxylic acids, sulfonates, and sulfosuccinates can also be used.

Ink-Jet Ink Composition

The ink-jet ink compositions for use with the present invention typically include a liquid vehicle and a charged colorant, such as an anionic dye and/or an anionic pigment, or alternatively, a cationic dye and/or cationic pigment, depending on the system. Optionally, the liquid vehicle can carry other compositions other than the colorant, such as dispersed polymers or the like. In accordance with embodiments of the present invention, ink-jet inks that include dyes, pigments, or both dyes and pigments can be used.

Various types of pigments can be used, such as self-dispersed pigments and/or polymer dispersed pigments. Self dispersed pigments typically include small molecule or polymeric dispersing agents attached to the surface of the pigment particulates. If a non self-dispersed pigment is used, then the liquid vehicle can further comprise a dispersing agent that associates with the pigment, or the pigment can be physically coated with the dispersing agent. Dispersing agents can be polymers, oligomers, surfactants, small molecules, or the like. In embodiments where the fixer composition includes a cationic component, and the polymer overcoat composition is an anionic polymer overcoat composition, examples of anionic pigments that can be used include anionic self-dispersed pigments or pigments stabilized with anionic polymeric dispersants. Conversely, in embodiments where the fixer composition includes an anionic component, and the polymer overcoat composition is a cationic polymer overcoat composition, examples of cationic pigments that can be used include cationic self-dispersed pigments or pigments stabilized with cationic polymeric dispersants.

Turning to the anionic dyes that can be used with cationic fixer compositions and anionic polymer overcoat compositions, the anionic dye can be a chromophore having a pendent anionic group, or other anionic charged dye. Examples of suitable anionic dyes include a large number of water-soluble acid and direct dyes. Specific examples of anionic dyes include Direct Yellow 86, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, and Direct Yellow 132; Aminyl Brilliant Red F-B (Sumitomo Chemical Co.); the Duasyn line of "salt-free" dyes available from Hoechst; mixtures thereof; and the like. Further examples include Bernacid Red 2BMN, Pontamine Brilliant Bond Blue A, BASF X-34, Pontamine, Food Black 2, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof, and the like. This list is intended to be merely exemplary, and should not be considered limiting.

In systems wherein the fixer composition includes an anionic component and the polymer overcoat composition is a cationic polymer overcoat, examples of cationic dyes that can be used include Auramine O, Yellow 4G, Yellow 8GL, Yellow X-2RL, Yellow 7GLL, Yellow 7GL, Yellow GL, Yellow 10GFF, Yellow 49, Yellow 5GL, Yellow 62, Yellow 4GL, Chrysoidine, Orange GL, Rhodamine 6GDN, Red B, Red 9, Pink X-FG, Brilliant Red 5GN, Red GTL, Red F3BL, Red 2GL, Red GRL, Red M-RL, Methyl Violet 2B, Methyl Violet 5BN, Red 6B, Violet 8, Rhodamine B, Basic Violet 14, Basic Violet 16, Turquoise Blue GB, Victory Pure Blue BO, Methylene Blue 2B, Victory Blue R, Victory Blue B, Basic GRL/GRRL, Violet Blue 3BL, Brilliant Blue RL, Blue FBL, Blue FRL, Brilliant Green, Malachite Green, Bismark Brown G, Bismark Brown R, and the like.

Polymer Overcoat Composition

With respect to the methods, systems, or printed images set forth herein, the polymer overcoat composition can include a latex dispersion including latex particulates, or can merely include polymeric particulates dispersed in a liquid vehicle. In systems that utilize a cationic fixer composition and an ink-jet ink including an anionic colorant, an anionic polymer overcoat composition can be used. In systems that utilize an anionic fixer composition and an ink-jet ink including a cationic colorant, a cationic polymer overcoat composition can be used. In either case, the polymeric particulates can have a particle size range from about 20 nm to 500 nm, and in one embodiment, can be from about 100 nm to 300 nm. Preferably, the polymer overcoat composition can be colorless or substantially colorless, as it is typically overprinted with respect to the ink-jet ink used to form the colored portion of the printed image.

Latex particulate surface charge is typically created through emulsion polymerization of an acid monomer, with or without other monomers, to form latex particulates. This process is generally known in the art. There are a number of compositions that can make up the polymeric particulates of the latex dispersions, including randomly polymerized monomers, wherein the polymeric particulates as a whole are from about 10,000 Mw to 2,000,000 Mw, and in one embodiment, from about 40,000 Mw to 100,000 Mw. Additionally, polymeric particulates of the latex dispersion can have a glass transition temperature from 25° C. to 100° C. Exemplary latexes that can be used include NM 3266-B and NM 3270-B, both from Rohm and Haas.

If the anionic polymer overcoat composition is not a latex dispersion, but is merely anionic polymeric particulates dispersed in a liquid vehicle, then examples of such compositions that can be used, Joncryl 74 and Joncryl 624, both from Johnson Polymer. If the polymer overcoat composition is a cationic polymer overcoat composition, exemplary compositions that can be used include poly(vinyl pyridine) salts, polyalkylaminoethyl acrylates, polyalkylaminoethyl methacrylates, poly(vinyl imidazole), poly(glucosamine), polyethyleneimines, polybiguanides, polyhexmethyleneguanidine, polyguanides, and the like.

Liquid Vehicle and other Printing Considerations

With respect to the fixer composition, ink-jet ink composition, and the polymer overcoat composition, each composition typically includes a liquid vehicle. Any of a number of components can be present that are effective for use with thermal or piezo ink-jet ink technologies. For example, the liquid vehicle of the fixer composition, ink-jet ink composition, or polymer overcoat composition can comprise an effective amount of water, from 0 wt % to 5 wt % of a surfactant, from 5 wt % to 50 wt % of a solvent, from 0 wt % to 2 wt % of a biocide. Other components can also be present, as would be known to those skilled in the art after considering the present disclosure. Additionally, multiple liquid vehicle components of a single class can also be present, such as multiple solvents, multiple surfactants, etc. In one embodiment, a typical liquid vehicle formulation that can be used with the latexes or polymers described herein can include water, and optionally, one or more co-solvents present in total at from 5 wt % to 30 wt %, depending on the ink-jet architecture. Further, one or more non-ionic, cationic, anionic, or amphoteric surfactant(s) can be present, ranging from 0.1 wt % to 5 wt %. The balance of the formulation can be purified water, or other vehicle components known in the art, such as biocides, viscosity modifiers, material for pH adjustment, sequestering agents, preservatives, and the like. Typically, the liquid vehicle is predominantly water.

Classes of co-solvents that can be used in the liquid vehicle can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylenediaminetetraacetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

Thermal ink-jet systems are quite different in their jetting properties than piezo ink-jet systems. As such, polymers (as can be present in the fixer composition, ink-jet ink composition, or polymer overcoat composition) that are effective for use in piezo ink-jet systems are not necessarily effective for use with thermal ink-jet ink systems. However, the converse is not necessarily true. In other words, polymers that work well with thermal ink-jet systems are more likely to work with piezo systems than vice versa. Therefore, the selection of polymers for use with thermal ink-jet systems often requires more care, as thermal ink-jet systems are less forgiving than piezo ink-jet systems. As such, exemplary polymers and other components described for the fixer composition, ink-jet ink composition, and the anionic polymer overcoat composition are particularly adapted for use with thermal ink-jet ink systems, though they are functional with piezo ink-jet ink systems as well. Other components may be effective for use if a piezo ink-jet ink printing system is used.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Preparation of PEI/$Ca^{2+}$ Fixer Compositions

An ink-jettable polyethyleneimine/calcium ion-containing fixer composition was prepared according to Table 1 as follows:

TABLE 1

PEI/$Ca^{2+}$ fixer composition

| INGREDIENT | Wt % |
|---|---|
| Ethoxylated trimethylnonanol | 0.45 |
| Olefine sulfonate | 0.2 |
| 2-Pyrrolidone | 5 |
| Alkyl Diol | 10 |
| TINNULOX ™ BBS | 100 ppm |
| Polyethyleneimine | 5 |
| Calcium Nitrate · $4H_2O$ | 2.5 |
| Deionized water | Balance |
| Total | 100 |

*PH adjusted to 4.0 with NaOH or $HNO_3$

Example 2

Preparation of Polybiguanide Fixer Composition

An ink-jettable polybiguanide-containing fixer composition was prepared according to Table 2 as follows:

TABLE 2

| Polybiguanide fixer composition | |
|---|---|
| INGREDIENT | Wt % |
| Propylene glycol n-propyl ether | 1 |
| Alkyl Diol | 5 |
| Fluorosurfactant | 0.3 |
| Polyoxyethylene ether | 0.4 |
| 2-pyrrolidone | 10 |
| $Na_2EDTA$ | 0.1 |
| Polybiguanide | 4 |
| Deionized water | Balance |
| Total | 100 |

*PH adjusted to 4.0 with NaOH or $HNO_3$

Example 3

Preparation of Anionic Pigment-Based Ink-Jet Ink Composition

An ink-jettable anionic pigment-containing ink-jet ink composition was prepared according to Table 3 as follows:

TABLE 3

| Ink-jet ink composition | |
|---|---|
| INGREDIENT | Wt % |
| 2-Pyrrolidinone | 7 |
| Alkyl diol | 4 |
| Ethoxylated glycerol | 1.5 |
| Surfynol 61 | 1 |
| Fluorosurfactant | 0.2 |
| Anionic black pigment | 3 (solids) |
| Water | Balance |
| Total | 100 |

Example 4

Preparation of Anionic Polymer Overcoat Composition

An ink-jettable anionic polymer overcoat composition was prepared according to Table 4 below:

TABLE 4

| Anionic polymer overcoat composition | |
|---|---|
| INGREDIENT | Wt % |
| Proxel GXL | 0.20 |
| 2-Pyrrolidone | 6 |
| Alkyl diol | 4 |
| Ethoxylated glycerol | 3 |
| Glycerol | 0.5 |
| Neopentyl alcohol | 0.75 |
| Surfynol 61 | 0.75 |
| Fluorosurfactant | 0.2 |
| 23.59% Neocryl QX-26-B (anionic polymers) | 4 (solids) |
| Non-anionic polymers | 4 (solids) |

TABLE 4-continued

| Anionic polymer overcoat composition | |
|---|---|
| INGREDIENT | Wt % |
| Water | Balance |
| Total | 100 |

*Anionic polymers adjusted to pH 8.2 to 8.5
*Other polymers adjusted to pH 4

Example 5

Wet Smudge Performance

The fixer composition of Example 1 was printed in several bar pattern samples on Hammermill Color Copy print media. Next, the ink-jet ink of Example 3 was immediately overprinted with respect to each fixer composition sample. The anionic polymer overcoat composition of Example 4 was then immediately printed over the ink-jet ink of the respect samples. This printing scheme was followed using the following drop weight ratios:

Ratio 1
1 drop fixer composition
2 drops ink-jet ink composition
4 drops anionic polymer overcoat composition
Ratio 2
2 drops fixer composition
4 drops ink-jet ink composition
4 drops anionic polymer overcoat composition.

Three samples of each ratio combination were prepared for each smudge test. After allowing the various printed image to dry for a few minutes, various smudge testes were conducted, including (1) a drip and finger smudge test, (2) an acidic highlighter smudge test, and (3) an alkali highlighter smudge test. Each of the printed images that was subjected to each smudge test had an initial high optical density (OD), e.g., about 1.4 OD or greater, indicating a rich black image before conducting each smudge test.

Specifically, smudge performance was tested as several printed bars were "wet smudged" by deliberating attempting to cause a smudge trail after printing. The first wet smudge test (1) was conducted by holding the printed bar pattern image at a 45° angle, dropping 0.25 cc of water onto the image, and after observing the smudge trail left by the water, smudging the dampened area with a finger. In each printed sample, the smudge trail left by the water droplets alone was not detectable, and the smudge trail resulting from a finger smudge of the water trail was minimal. The second wet smudge test (2) was conducted as a sample of each of the printed images was passed over two times with an acid highlighter. No noticeable smudge was observed. The third wet smudge test (3) was conducted as another sample of each of the printed images was passed over two times with an alkaline highlighter. Again, no noticeable smudge was observed. Though the fixer composition of Example 1 was used in the present example, the fixer composition of Example 2 can be used with similar results.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A system for printing durable ink-jet ink images, comprising:

a) a first printhead containing a fixer composition including a charged fixer component, said first printhead configured for ink-jet printing the fixer composition on a substrate;

b) a second printhead containing an ink-jet ink, said second printhead configured for ink-jet printing the ink-jet ink composition over the fixer composition, said ink-jet ink including a colorant carrying an opposite charge with respect to the charged fixer component; and c) a third printhead containing a polymer overcoat composition, said third printhead configured for ink-jet printing the polymer overcoat composition over ink-jet ink composition, wherein the polymer of the polymer overcoat composition also carries an opposite charge with respect to the charged fixer component.

2. A system as in claim 1, wherein the charged fixer component is a cationic fixer composition, the colorant is an anionic colorant, and the polymer overcoat composition is an anionic polymer overcoat composition.

3. A system as in claim 1, wherein the charged fixer component is an anionic fixer composition, the colorant is a cationic colorant, and the polymer overcoat composition is a cationic polymer overcoat composition.

4. A system as in claim 1, wherein the fixer composition includes a first liquid vehicle and a charged polymer.

5. A system as in claim 4, wherein the charged polymer is a cationic polymer selected from the group consisting of poly(vinyl pyridine) salts, polyalkylaminoethyl acrylates, polyalkylaminoethyl methacrylates, poly(vinyl imidazole), polyethyleneimines, polybiguanides, and polyguanides, and combinations thereof.

6. A system as in claim 1, wherein the fixer composition includes a first liquid vehicle and a multivalent salt.

7. A system as in claim 1, wherein the fixer composition includes a first liquid vehicle and an organic acid.

8. A system as in claim 1, wherein the ink-jet ink includes a second liquid vehicle and a dye.

9. A system as in claim 1, wherein the ink-jet ink includes a second liquid vehicle and a pigment.

10. A system as in claim 1, wherein the polymer overcoat composition includes a third liquid vehicle and polymeric particulates.

11. A system as in claim 10, wherein the polymer overcoat composition includes a latex dispersion.

12. A system as in claim 11, wherein the polymeric particulates have an average particle size from about 20 nm to 500 nm.

13. A system as in claim 12, wherein the polymeric particulates are anionic polymeric particulates, and have an average particle size from about 100 nm to 300 nm.

14. A system as in claim 11, wherein the polymeric particulates comprise a plurality of randomly polymerized monomers, and wherein the weight average molecular weight of the polymeric particulates is from about 5,000 Mw to 2,000,000 Mw.

15. A method for printing durable ink-jet ink images, comprising steps of:

a) applying a cationic fixer composition to a media substrate;

b) jetting an ink-jet ink composition onto the fixer composition that has been applied to the media substrate, said ink-jet ink including an anionic colorant; and c) jetting an anionic polymer overcoat composition onto the ink-jet ink composition that has been jetted onto the fixer composition.

16. A method as in claim 15, wherein the applying step is by a jetting process.

17. A method as in claim 15, wherein the cationic fixer composition includes a first liquid vehicle and a cationic polymer.

18. A method as in claim 17, wherein the cationic polymer is selected from the group consisting of poly(vinyl pyridine) salts, polyalkylaminoethyl acrylates, polyalkylaminoethyl methacrylates, poly(vinyl imidazole), polyethyleneimines, polybiguanides, and polyguanides, and combinations thereof.

19. A method as in claim 15, wherein the cationic fixer composition includes a first liquid vehicle and a multivalent salt.

20. A method as in claim 15, wherein the cationic fixer composition includes a first liquid vehicle and an organic acid.

21. A method as in claim 15, wherein the ink-jet ink includes a second liquid vehicle and a dye.

22. A method as in claim 15, wherein the ink-jet ink includes a second liquid vehicle and a pigment.

23. A method as in claim 15, wherein the anionic polymer overcoat composition includes a third liquid vehicle and anionic polymeric particulates.

24. A method as in claim 23, wherein the anionic polymer overcoat composition includes a latex dispersion.

25. A method as in claim 24, wherein the anionic polymeric particulates have an average particle size from about 100 nm to 300 nm.

26. A method as in claim 24, wherein the anionic polymeric particulates comprise a plurality of randomly polymerized monomers, and wherein the anionic polymeric particulates have a weight average molecular weight from about 5,000 Mw to 2,000,000 Mw.

27. A method for printing durable ink-jet ink images, comprising steps of:

a) applying an anionic fixer composition to a media substrate;

b) jetting an ink-jet ink composition onto the fixer composition that has been applied to the media substrate, said ink-jet ink including a cationic colorant; and c) jetting a cationic polymer overcoat composition onto ink-jet ink composition that has been jetted onto the fixer composition.

28. A method as in claim 27, wherein the applying step is by a jetting process.

29. A durable printed image, comprising:

a) a media substrate;

b) a cationic fixer composition jetted on the media substrate as a first printed layer;

c) an ink-jet ink composition jetted on the fixer composition as a second printed layer, said ink-jet ink including an anionic colorant; and d) an anionic polymer overcoat composition jetted on the ink-jet ink composition as a third printed layer.

30. A durable printed image as in claim 29, wherein the cationic fixer composition includes a first liquid vehicle and a cationic polymer.

31. A durable printed image as in claim 29, wherein the cationic fixer composition includes a first liquid vehicle and a multivalent salt.

32. A durable printed image as in claim 29, wherein the cationic fixer composition includes a first liquid vehicle and an organic acid.

33. A durable printed image as in claim 29, wherein the ink-jet ink includes a second liquid vehicle and a dye.

34. A durable printed image as in claim 29, wherein the ink-jet ink includes a second liquid vehicle and a pigment.

35. A durable printed image as in claim 29, wherein the anionic polymer overcoat composition includes a third liquid vehicle and anionic polymeric particulates.

36. A durable printed image as in claim 33, wherein the anionic polymer overcoat composition includes a latex dispersion.

37. A durable printed image as in claim 29, wherein the first layer, the second layer, and the third layer are printed in succession such that each of the layers are still wet when the layers are initially formed, and wherein incomplete mixing between layers occurs.

38. A durable printed image, comprising:

a) a media substrate;

b) an anionic fixer composition jetted on the media substrate as a first printed layer;

c) an ink-jet ink composition jetted on the fixer composition as a second printed layer, said ink-jet ink including a cationic colorant; and d) a cationic polymer overcoat composition jetted on the ink-jet ink composition as a third printed layer.

39. A durable printed image as in claim 38, wherein the first layer, the second layer, and the third layer are printed in succession such that each of the layers are still wet when the layers are initially formed, and wherein incomplete mixing between layers occurs.

* * * * *